US007861959B2

(12) United States Patent
Eriksen

(10) Patent No.: US 7,861,959 B2
(45) Date of Patent: Jan. 4, 2011

(54) CRUSHING MACHINE FOR COMMINUTING LAMINATED GLASS

(75) Inventor: Bent Eriksen, Hørve (DK)

(73) Assignee: SHARK Solutions A/S, Svinninge (DK)

( * ) Notice: Subject to any disclaimer, the term of this patent is extended or adjusted under 35 U.S.C. 154(b) by 92 days.

(21) Appl. No.: 12/087,210

(22) PCT Filed: Dec. 28, 2006

(86) PCT No.: PCT/DK2006/000750

§ 371 (c)(1),
(2), (4) Date: Dec. 15, 2008

(87) PCT Pub. No.: WO2007/073738

PCT Pub. Date: Jul. 5, 2007

(65) Prior Publication Data

US 2009/0261191 A1    Oct. 22, 2009

(30) Foreign Application Priority Data

Dec. 29, 2005    (DK) .......................... PA 2005 01846

(51) Int. Cl.
*B02C 13/286* (2006.01)
(52) U.S. Cl. .............................. 241/186.35; 241/186.4; 241/189.1; 241/194; 241/285.3
(58) Field of Classification Search ............. 241/189.1, 241/DIG. 30, 186.35, 186.4, 194, 195, 285.3
See application file for complete search history.

(56) References Cited

U.S. PATENT DOCUMENTS 113,443 A    4/1871    Myers 1,422,761 A    7/1922    Hartman
1,960,626 A    5/1934    Everett (Continued)

FOREIGN PATENT DOCUMENTS

EP    0887156    12/1998

(Continued)

*Primary Examiner*—Mark Rosenbaum
(74) *Attorney, Agent, or Firm*—James Creighton Wray

(57) ABSTRACT

A crushing machine for comminuting laminated glass, particularly windshields for cars, consists of a chamber with cylindric wall (24) in which is suspended a rotor (28) with pivotably beaters (50). Plural layers of laminated glass are fed through a feeding opening (20) through rubber rollers (22) which form an almost airtight lock into the crushing chamber. At the inner side of its wall (24), the chamber is provided with a number of evenly distributed ribs (54) to be impacted by laminated glass pieces, which are subsequently further comminuted by the beaters (50). The crushing chamber is provided with a slot-formed discharge opening (34) which may be varied in width. Outside the discharge opening (34), there is mounted a collecting containing (36) provided with subpressure. Due to naturally occurring leaks in the wall (24) of the crushing chamber, including the feeding opening (22), there will be a continuous flow of air out through the opening (34), why the material will eventually be conducted therethrough and collected in a container (36). From here, the material may leave the container (36) through an aperture closed by a flap (38). With the crushing machine according to the invention, there may be achieved a complete comminution of laminated glass material and separation of glass from the plastic film in one step and so that the finest glass particles have a size in the order of 0-3 millimeters.

8 Claims, 3 Drawing Sheets

U.S. PATENT DOCUMENTS

| | | |
|---|---|---|
| 3,436,028 A | 4/1969 | Koehnen et al. |
| 3,545,689 A * | 12/1970 | Luscombe ............... 241/186.4 |
| 3,545,690 A | 12/1970 | Burian et al. |
| 3,637,146 A | 1/1972 | Banks |
| 5,465,912 A | 11/1995 | Graybill et al. |
| 5,484,109 A | 1/1996 | Cook |
| 5,505,390 A | 4/1996 | Rodgers |
| 5,984,216 A | 11/1999 | Andela et al. |

FOREIGN PATENT DOCUMENTS

| | | |
|---|---|---|
| JP | 11-197605 | 7/1999 |
| WO | WO 01/51211 | 7/2001 |

* cited by examiner

CRUSHING MACHINE FOR COMMINUTING LAMINATED GLASS

This application claims the benefit of Danish Application No. PA 2005 01846 filed Dec. 29, 2005 and PCT/DK2006/000750 filed Dec. 28, 2006, which are hereby incorporated by reference in their entirety.

FIELD OF THE INVENTION

The present invention concerns a crushing machine for comminuting laminated glass, in particular windshields for vehicles, including a closed crushing chamber where the wall of the chamber is provided with a feeding slot for glass and a discharge opening for crushed glass and comminuted plastic film, where the crushing chamber contains a rotary shaft extending through the crushing chamber and driven by a motor outside the crushing chamber, where the shaft is provided with pivotable beaters or hammers which are spaced along the shaft inside the crushing chamber, where the crushing chamber is provided with a controlled air leakage in the way that the discharge opening constitutes the only significant air passage in the crushing chamber, where the discharge opening is connected to a lock intended for collecting comminuted material, where a subpressure can be applied to the lock, and where the discharge opening is disposed spaced apart from the bottom of the crushing chamber. The glass laminate usually consists of two layers of glass between which a film of plastic is embedded by bonding. This produces a strong and tough material which is difficult to break.

BACKGROUND OF THE INVENTION

From U.S. Pat. No. 5,984,216 there is known a crushing machine including a closed crushing chamber where the chamber wall is provided with a feeding slot for glass and a discharge opening for crushed glass and comminuted plastic film. The crushing chamber includes a rotary shaft extending through the crushing chamber and driven by a motor outside the crushing chamber, where the shaft is provided with pivoting beaters or hammers distributed along the shaft inside the crushing chamber.

The prior art crushing machine is intended for manual feeding of single layers of laminated glass between two parallel rollers disposed horizontally opposite the rotary shaft. The rollers are powered by a motor and suspended by springs so that they are pre-stressed to bear against each other and may yield, so that by their movement and by friction action caused by the squeezing between the rollers, a laminated glass pane can be drawn into the crushing chamber. Immediately within the feeding slot and the rollers in the crushing chamber there is provided a supporting retainer in the shape of a steel bar which is parallel with the shaft and upon which the glass layer is supported and slides across, until the glass is hit by the hammers which by the rotation of the shaft strikes the edge of the glass laminate projecting beyond the steel bar. The glass is thereby broken into small pieces and separated from the plastic film. The chamber is substantially rectangular and has no other measures for enhancing the crushing process, and the comminuting of the glass laminate as such is effected by breaking on the transverse steel bar. The material thus comminuted, consisting of glass as well as plastic, is now conducted out through the bottom of the chamber by the action of gravity, where a vibrating sieve is provided that lets the glass pieces pass through to an underlying container while plastic pieces are conducted to another container at the side.

The crushing machine disclosed in the US patent is intended for comminuting a single laminated pane at a time by manual operation. Practical embodiments of this crushing machine made by the firm Andela Tool & Machine Inc., USA, appear to require subsequent comminuting operations with other crushing apparatuses in order to attain sufficient comminution of glass and plastic. Besides, U.S. Pat. No. 5,984,216 mentions the existence of other crushing machines with much greater capacity, but without describing their design or operation.

Furthermore, a crushing machine of the kind mentioned in the introduction is known from U.S. Pat. No. 5,505,390. This machine has a feeding slot and a discharge opening with fixed width. Here, it is difficult to achieve an efficient and simple collecting of comminuted material in the form of glass particles and pieces of plastic film from the discharge opening.

OBJECT OF THE INVENTION

One purpose of the invention is to provide a crushing machine for laminated glass panes with capacity to receive several layers of laminated glass at a time in an industrial order of magnitude. Moreover, it is a purpose to provide a crushing machine which can comminute laminated glass sufficiently in one step. Also, it is a purpose to provide a crushing machine where automatic discharge of a large amount of comminuted glass and plastic through one and the same discharge opening can be effected in order to enable sorting and treating the materials in separate processes.

DESCRIPTION OF THE INVENTION

The particular feature of the crushing machine according to the invention is that the feeding slot is provided with a flexible lock mouth that may fit almost airtight around and adapt to varying thicknesses of incoming glass, and that the discharge opening is slot-formed with variable slot width, as the discharge opening is formed between a fixed part and a pivotable part of the wall of the crushing chamber.

Thus, by the invention is provided a crushing chamber with subpressure, and where a slight air flow moves out towards the discharge opening, as air flows in through leaks in the chamber, including at the feeding opening. Only glass and plastic material which is sufficiently comminuted will thereby go out through discharge opening, partly due to random movements of the material and partly due the flow of air towards the discharge opening. During the stay in the crushing chamber, the laminated glass is broken into pieces, strikes the inner wall of the chamber and rebounds back on the beaters/hammers, and by the continued working in the crushing chamber glass is separated from the plastic film. The glass is divided into small and light particles, while the plastic is torn into lesser pieces. The force of gravity, which is particularly acting on larger particles and pieces, has thus less or no significance at the discharging of the comminuted material, why the larger pieces remain for a longer time in the crushing chamber and is comminuted more before the discharging at a distance above the bottom of the chamber. With regard to environment and process, the inner subpressure also entails that glass dust is kept inside the machine until the material is discharged.

As the feeding slot is provided with a flexible lock mouth, a more sure control of the air flow through the discharge opening may be attained. This is achieved in that the lock mouth fits almost airtightly about and adapts to varying thicknesses of incoming glass.

The discharge opening is slot-formed with variable slot width, as the discharge opening is formed between a fixed part and a pivotable part of the wall of the crushing chamber. The discharge opening may thereby be adapted to the nature of the comminuted material and the retention time in the crushing chamber may possibly be extended, as the comminuted plastic film e.g. has varying tendency to leave the chamber in dependence on its temperature.

In an embodiment of the invention, the crushing chamber is substantially cylindric with a horizontal cylinder axis, the rotary shaft is disposed along the cylinder axis, and the inner side of the crushing chamber facing the beaters or hammers is provided with a number of evenly distributed ribs or bars extending mainly along the cylinder axis. The ribs prevent glass laminate pieces and larger pieces of glass or plastic film from only rotating along the cylindric inner wall due to the air flow produced by the beaters, but instead providing that these pieces of material strike the ribs and rebound back onto the beaters, and are further comminuted.

It is preferred that the flexible lock mouth consists of a pair of rollers lying along the feeding slot and which are in contact with each other, the rollers being covered with or substantially consisting of rubber having a texture and a thickness so as to enable passage of several layers of glass between the rollers at the same time. Thereby is achieved a simple and relatively airtight lock at the feeding opening so that a large amount of glass laminate can be inserted continuously.

In order to utilise the weight of the laminated glass for feeding the crushing chamber, the feeding opening can be disposed in an upper half of the crushing machine, so that the feeding opening is facing obliquely upwards.

It is preferred that the discharge opening is disposed about horizontally opposite the rotary shaft. By disposing the discharge opening this way and at the same time under the feeding opening, combined with the rotation of the beaters occurring from the discharge opening towards the feeding opening, material broken into pieces at the feeding will to be forced almost an entire round by the beaters before having the opportunity to leave the crushing chamber, whereby comminution of glass and plastic may be effected to the highest degree before discharging.

In a preferred embodiment of the crushing machine according to the invention, the beaters or hammers are mounted freely pivoting between peripheral parts of substantially star-shaped holder plates that are disposed in parallel and fastened perpendicularly to the rotary shaft, and where successive holder plates are mutually angularly offset along the shaft so that their peripheral parts are partly overlapping each other. By using star-shaped plates which are e.g. welded onto the shaft, a very sturdy design of the rotor carrying beaters or hammers is achieved. This also entails simplification of the rotor construction, as each plate may be fitted with beaters at both sides, reducing the number of plates for each "layer" of beaters perpendicular to the axis of rotation, except for the plates at the ends.

The angular offsetting of the holder plates may be arranged symmetrically about the centre of the length of the rotary shaft, and in such a way relative to the direction of rotation of the shaft that the peripheral parts of the holder plates and the beaters perform a spiral motion towards the centre of the crushing chamber during rotation of the shaft. Thereby is achieved a spiralling flow of air and materials against the centre of the crushing chamber so that the material is retained in the processing area of the chamber, and is moved away from the ends of the chamber where no processing and comminution is performed due to the geometry and the absence of centrifugal force.

In order to provide an efficient and simple collection of comminuted material in the form of glass particles and pieces of plastic film, the lock opposite the discharge opening may include a box-shaped structure and a flap which is hinged about a horizontal axis at a top edge of the flap and fitting airtightly, or about airtightly, to an aperture for discharging crushed material coming from the crushing chamber, where the bottom of the structure slopes down towards the aperture. The subpressure inside the box-shaped structure, which functions as a collecting container, provides that the flap is sucked against the aperture. When the weight of collected material becomes sufficiently large during the comminuting process, this weight will press the flap to open, whereafter the material will fall down upon a sieve or a conveyor belt for further processing.

DESCRIPTION OF THE DRAWING

An embodiment of the invention is described below with reference to the enclosed drawing, in which.

EMBODIMENT EXAMPLES OF THE INVENTION

Figure 1:
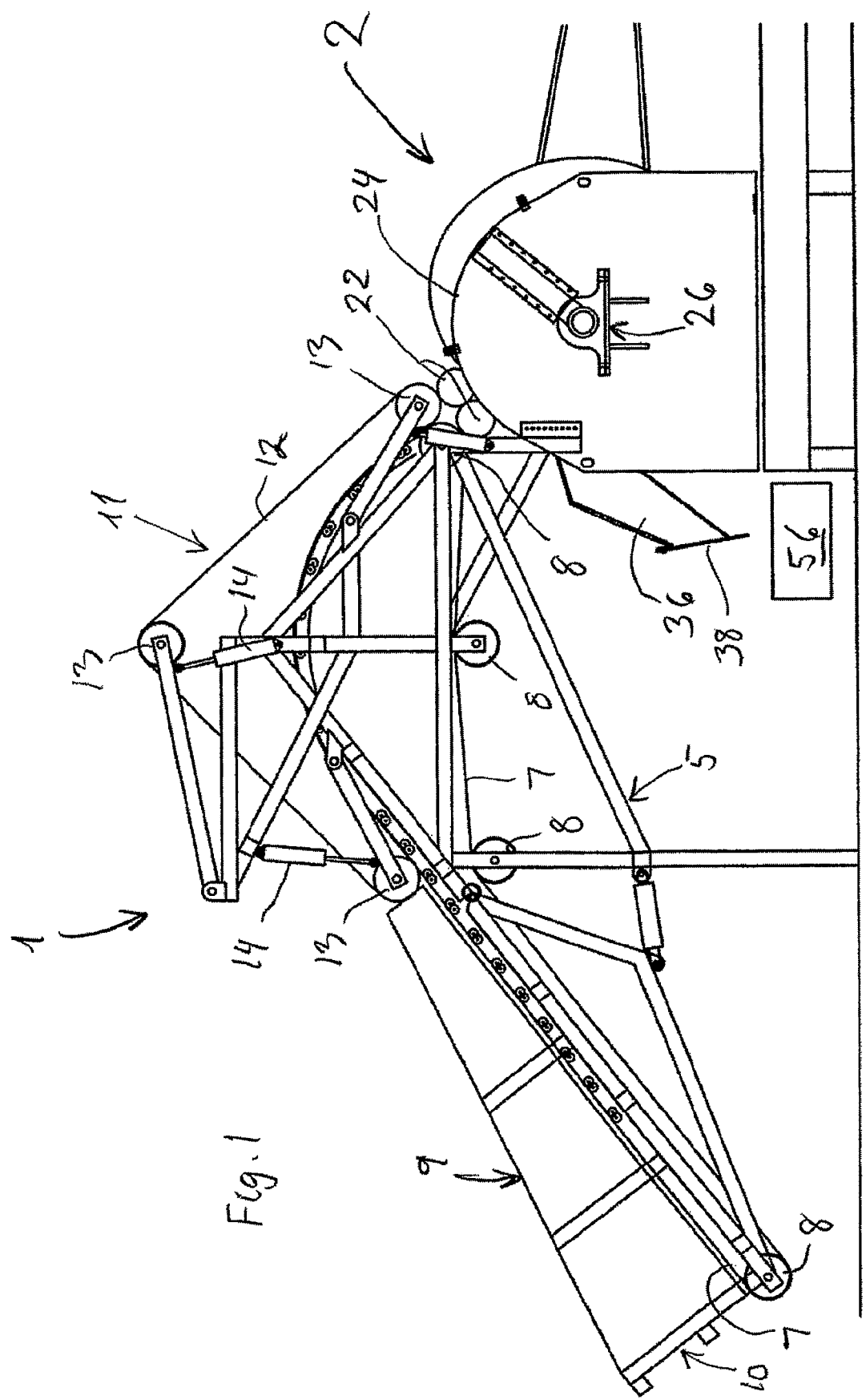
FIG. 1 is a side view showing an embodiment of a crushing machine according to the invention and a connected feeding device for the crushing machine.

The overview on FIG. 1 shows a feeding device 1 and a crushing machine 2 according to the invention. The feeding device 1 is a specially designed conveyor which can feed glass or laminated glass panes into the crushing machine 2 according to the invention. The feeding device 1 is not part of the invention and may be designed in various ways, but is described below for information purposes.

The feeding device 1 consists of a frame 5 composed of several posts, beams and struts. The frame 5 is provided with an endless conveyor belt 7 running on rollers 8. The belt 7 runs from the left to the right, as seen on the drawing, at first sloping upwards, then in a curved arch and finally terminating immediately above the crushing machine 2, after which the belt runs back to the starting point at the lower left on FIG. 1. The feeding device 1 is provided with a collecting box 9 where only the nearest sidewall appears on the Figure. The box 9 is standing up along two parallel sides of the belt 7, where only one side is shown, and is provided with a bottom wall 10 extending into the drawing on the Figure, so that one may load material up into the box 9 and onto the lowermost part of the belt 7, without the glass plates sliding off the belt 7.

At the top of the feeding device, a retainer means 11 in the form of a second belt 12 is provided which is kept tensioned by means of idle rollers 13, as pressure means cylinders 14 provide the force producing the tensioning force. At the top, the glass plates conveyed with the belt 7 will thus be clamped against the top side of the belt 7 by the second belt 12, and the glass plates will thus be retained and controlled on the way down to the crushing machine 2. Between the collecting box 9 and the adjacent end of the overlying belt 12, a not shown deflector plate is provided across the surface of the belt 7 so that not too many glass plates are drawn in under the belt 12.

Figure 2:
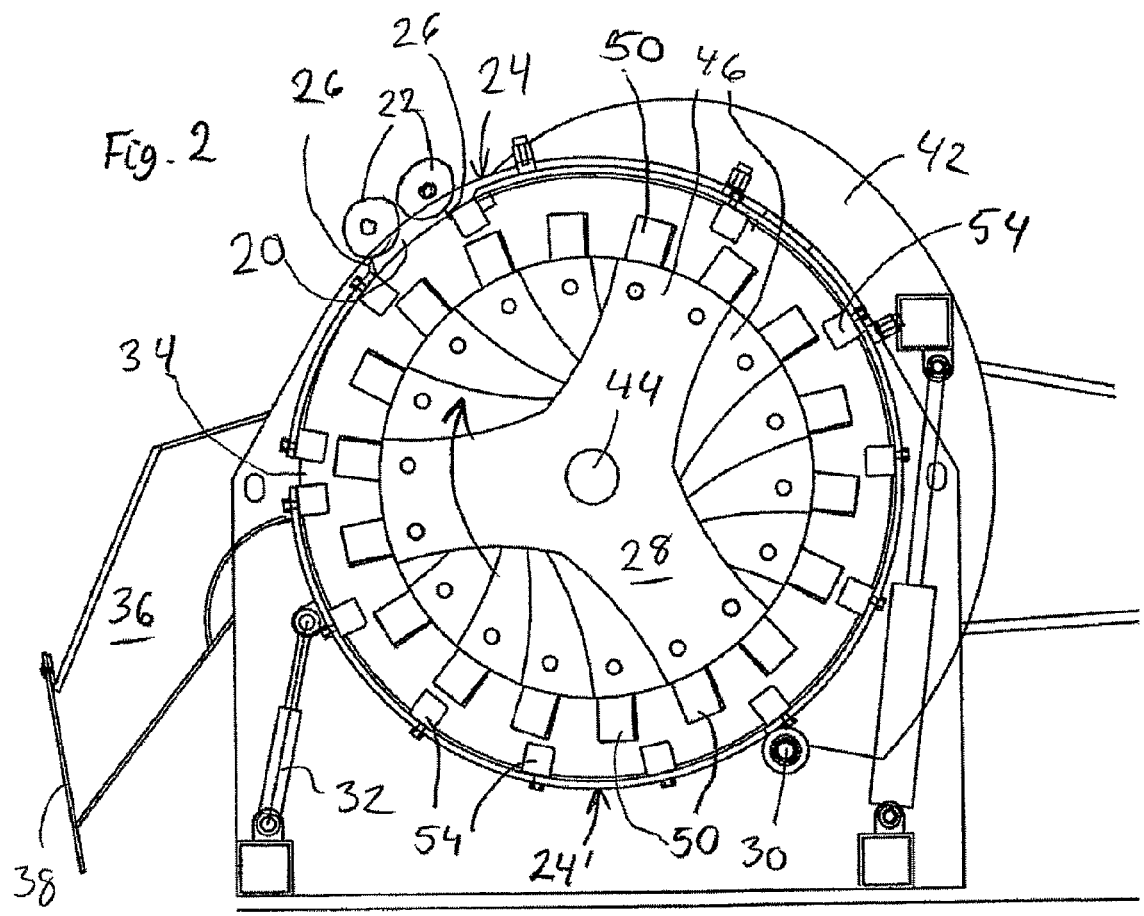
FIG. 2 shows the crushing machine on FIG. 1 only, but where the nearer end cover is removed.

The crushing machine 2 is provided with an obliquely upwards facing feeding slot 20, which appears on FIG. 2. The slot 20 is right opposite the place where the belts 7 and 12 separate and deliver material into the slot 20. In order to form a substantially airtight feeding, two mutually parallel rollers 22 are provided at the slot 20, the rollers 22 consisting of a steel axle surrounded by a thick rubber layer. The rollers 22 are suspended, freely rotating, by fixed bearings at their ends in a not shown way. The rubber on the rollers 22 is so thick and soft that though they are in close mutual contact when not operating, the rollers 22 may allow passage of material up to a thickness of 4-5 cm. Within the rollers 22, sealing lips 26 are provided on the housing 24 of the crushing machine, the lips 26 being in contact with the periphery of the rollers along their entire length so that a fairly airtight feeding opening 20 is ensured.

The housing 24 of the crushing machine is substantially cylindric with flat end sides, and on the closest end side shown on FIG. 1, there is fitted a bearing 26 externally for supporting one end of a rotor 28 provided with beaters or hammers 50, the rotor rotatably suspended inside the housing 24 of the crushing machine.

A bottom part 24' of the housing 24, as shown on FIG. 2, is suspended pivotably about a horizontal axis by means of a bearing 30 and a pressure means cylinder 32. A slot-formed discharge opening 34 is formed between the pivotable bottom part 24' and the stationary part of the housing 24. The discharge opening 34 opens op into a collecting container 36 that extends along the housing 24, i.e. into the plane of the paper. The collecting container 36 is connected to a vacuum in a not shown way so that air is constantly sucked from the interior of the housing 24 and into the container 36, however only to a limited degree. The collecting container 36 is closed with a pivoting flap 38 which as shown is hinged at the top, and which in its closed position is turned slightly away from the vertical against the action of gravity. Due to the subpressure, the flap 38 will always be sucked onto the obliquely downwards facing opening of the container 36, unless it is forced open by other actions.

The rotor 28 is driven in a not shown way via a belt or chain drive 40 from a not shown motor, as the structure 42 indicates a gearbox transmitting the rotation to the rotor 28. The rotor 28 is constructed around a centre shaft 44 on which is welded an array of substantially star-shaped plates 46, see also FIGS. 3 and 4. In the shown embodiment, each plate is provided with three arms which are relatively wide so that two mounting holes 48 can be provided close to the periphery of each arm. Between two adjacent plates 46 on the shaft, pivoting beaters or hammers 50 are fitted, as a pin or similar is provided between mutually opposed holes 48 in adjacent plates. Thus there are three pivotable hammers 50 for every layer of star-shaped plates 46.

Figure 3:
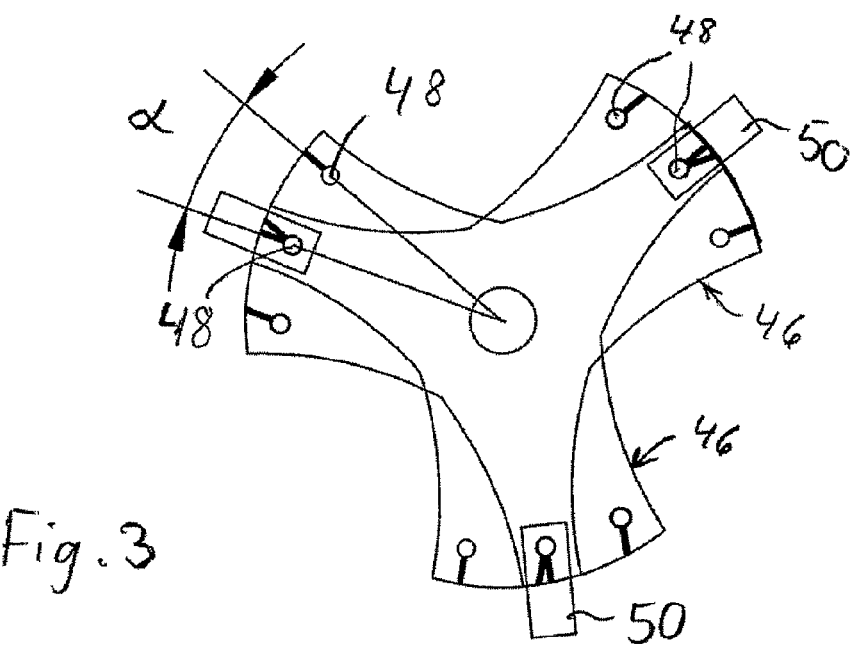
FIG. 3 shows a detail of a rotor for the crushing machine according to the invention in principle.
Figure 4:
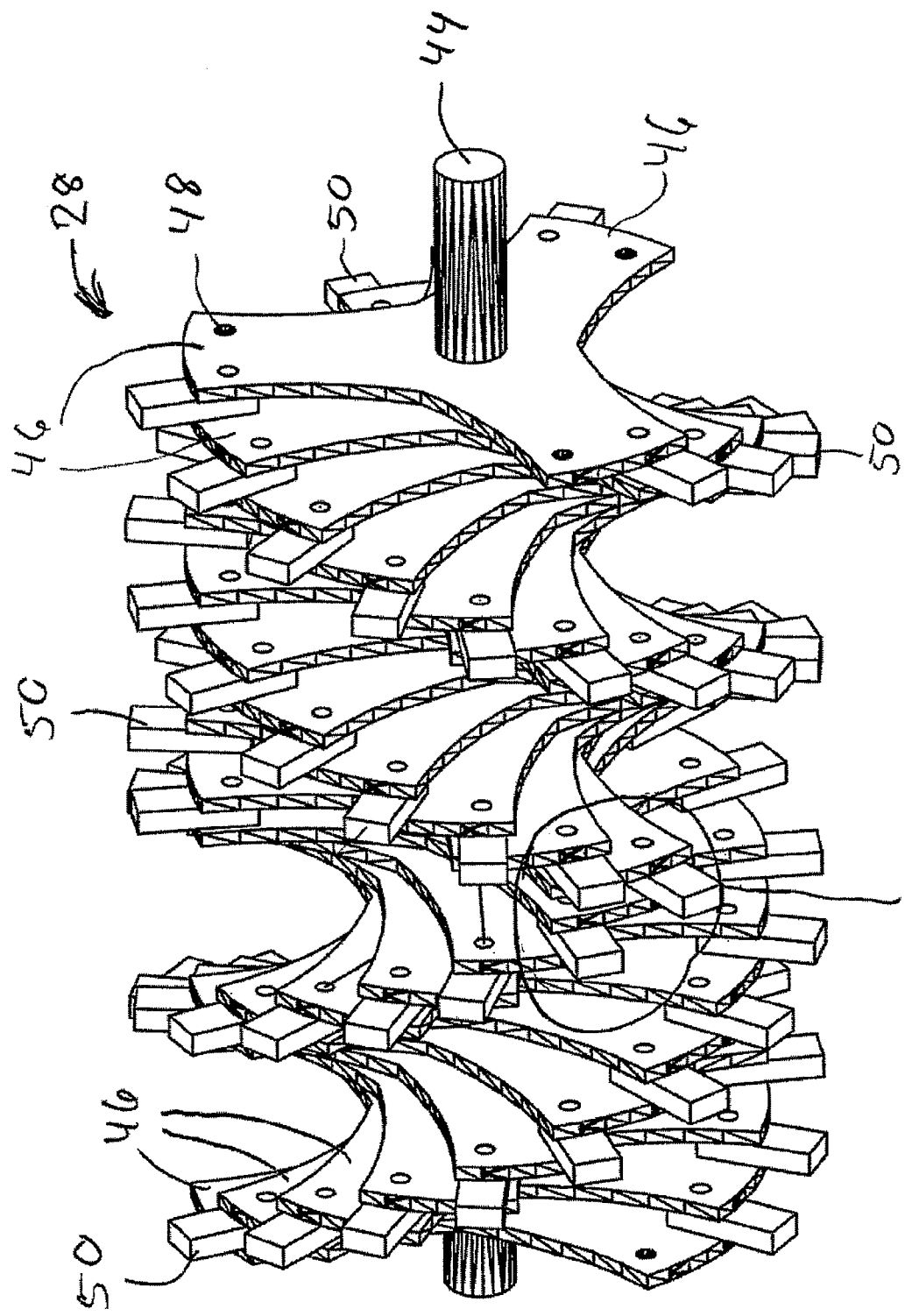
FIG. 4 is a perspective view of a rotor for the crushing machine according to the invention.

In order to provide an efficient and strong working of the incoming laminated glass, the plates 46 are mutually angularly displaced by an angle α, in that the angle between lines going through the centre axis of the shaft 44 and each of the two holes 48 in each plate 46 also have the angle α, see FIG. 3. Thereby may be provided the design shown on FIG. 4 where the plates 46 are partly overlapping each other with the angle α, and so that a successive displacement of the hammers 50 is effected for every layer. Each plate 46 will thus, except for the two plates at the ends of the shaft 44, contribute to suspend two times three hammers 50 at opposing sides of the plate 46.

By the shown embodiment, there is provided a helical suspension/array of the hammers 50. This helical form is preferred, however, not to extend in the same direction over the entire length of the shaft 44. As shown on FIG. 4, the helical form is mirrored about a centre plane perpendicular to the shaft 44, so that it extends in opposite "directions of rotation" when going from each of the free ends of the shaft 44 and towards the centre of the shaft 44. The shift in direction of rotation is most clearly seen at the encircled area on FIG. 4, reference 52. Thereby may be achieved a spiralling, whirling movement of plates 46 and hammers 50 against the centre of the crushing chamber inside the housing 24.

The inner side of the housing 24 is provided with a number of mainly evenly distributed ribs 54 in the form of rectangular steel bars extending along the cylinder axis of the housing 24. In the shown embodiment, the ribs 54 are parallel with the rotor shaft 44, but other embodiments may be envisaged where the ribs 54 have a slightly helical path at the inner side of the housing 24. The ribs 54 thus form retainers and impact members for the pieces of broken laminated glass coming into the crushing chamber, whereby the pieces are whirled around and turned in various angles, and they may hereby be successively worked from different sides with the hammers 50 during the rotation of the rotor 28. At each side of the feeding opening 20 there is disposed a rib 54', but in contrast to the prior art they are not to function as support or retainer immediately within the feeding opening 20 for material coming through the rollers 22.

The crushing machine operates as follows. Laminated glass, typically windshields for vehicles, are loaded in large quantities into the collecting container 9, whereafter the glass plates are moved up by the friction on the belt 7 and further on to an area where the belt 12 keeps the plates pressed onto the belt 7. The capacity of the feeding device 1 and the crushing machine 2 is so great that up to seven layers of glass at a time may be carried between the conveyors 7, 12. These superposed layers of laminated glass are then moved down between the rubber rollers 22 where they slide into the crushing chamber which is delimited by the housing 24. Immediately within the feeding opening 20, the projecting edges of the glass sheets are hit by several hammers 50 at once, in the shown embodiment simultaneously by four hammers 50 distributed across the entire width, and then by the other hammers 50 in succession over the remaining parts of the width. The edges of the glass laminate are thereby broken into larger or smaller pieces which then are whirled around in the crushing chamber. The direction of rotation of the rotor 28 is indicated with an arrow, i.e. clockwise on FIG. 2. The broken pieces are whirled around while they strike the ribs 54, change their direction, hit the inner side of the housing 24 and rebound back against the hammers 50 where they are further comminuted. In this way, the glass is broken off the plastic film in the laminated glass, and the plastic film is also comminuted. Thus is effected a continuous crushing and comminution inside the crushing chamber during the process, providing that the comminuting of glass and plastic film may be effected in one step.

In principle, the discharge opening 34 may have fixed width (in parallel with the paper plane), but as shown in the embodiment, it is preferred to have a pivoting bottom part 23' so that the slot-formed opening 34 can be adjusted. This is an advantage at varying temperatures, as the comminuted plastic film requires a larger opening 34 if the film is cold than if it is warm.

There is a moderate flow of air out through the opening 34, and as this is the only place where the material can come out, glass particles and pieces of plastic film may eventually pass through the opening 34 and be deposited in the collecting container 36. Due to the subpressure, the flap 38 will be kept closed until the weight of the material is so great that the flap 38 opens due to the weight of the collected material at the bottom of the container 36. The material thus collected consists of a mixture of crushed glass where the finest particles have a grain size of 0-3 mm, and where the comminuted plastic pieces have a side length of 10-20 cm. The material from the container 36 falls down into a not shown transport device 56, e.g. a conveyor belt, which moves the crushed material onwards to sorting in a way known per se.

The invention claimed is:

1. A crushing machine for comminuting laminated glass, and windshields for vehicles, including a closed crushing chamber where the wall of the chamber is provided with a feeding slot for glass and a discharge opening for crushed glass and comminuted plastic film, where the crushing chamber contains a rotary shaft extending through the crushing chamber and driven by a motor outside the crushing chamber, where the shaft is provided with pivotable beaters or hammers which are spaced along the shaft inside the crushing chamber, where the crushing chamber is provided with a controlled air leakage in the way that the discharge opening constitutes the only significant air passage in the crushing chamber, where the discharge opening is connected to a lock intended for collecting comminuted material, where a subpressure can be applied to the lock, and where the discharge opening is disposed spaced apart from the bottom of the crushing chamber, wherein the feeding slot is provided with a flexible lock mouth that may fit almost airtight around and adapt to varying thicknesses of incoming glass, and that the discharge opening is slot-formed with variable slot width, as the discharge opening is formed between a fixed part and a pivotable part of the wall of the crushing chamber.

2. Crushing machine according to claim 1, wherein the crushing chamber is substantially cylindric with a horizontal cylinder axis, that the rotary shaft is disposed along the cylinder axis, and that the inner side of the crushing chamber facing the beaters or hammers is provided with a number of evenly spaced ribs or bars extending mainly along the cylinder axis.

3. Crushing machine according to claim 1 where the flexible lock mouth consists of a pair of rollers lying along the feeding slot and which are in contact with each other, wherein the rollers are covered with or substantially consist of rubber having a texture and a thickness so as to enable passing several layers of glass between the rollers at the same time.

4. Crushing machine according any of claims 1-3, wherein the feeding opening is provided at an upper half of the crushing machine so that the feeding opening is facing obliquely upwards.

5. Crushing machine according any of claims 1-3, wherein the discharge opening is disposed about horizontally opposite the rotary shaft.

6. Crushing machine according to claim 1, wherein the beaters or hammers are mounted freely pivoting between peripheral parts of substantially star-shaped holder plates that are disposed in parallel and fastened perpendicularly to the rotary shaft, and where successive holder plates are mutually angularly offset along the shaft so that their peripheral parts are partly overlapping each other.

7. Crushing machine according to claim 6, wherein the angular offsetting of the holder plates is arranged symmetrically about the centre of the length of the rotary shaft, and in such a way relative to the direction of rotation of the shaft that the peripheral parts of the holder plates and the beaters perform a spiral motion towards the centre of the crushing chamber during rotation of the shaft.

8. Crushing machine according to claim 1, wherein the lock opposite the discharge opening includes a box-shaped structure and a flap which is hinged about a horizontal axis at a top edge of the flap and fitting airtightly, or about airtightly, to an aperture for crushed material coming from the crushing chamber, the bottom of the structure sloping down towards the aperture.

\* \* \* \* \*

UNITED STATES PATENT AND TRADEMARK OFFICE
CERTIFICATE OF CORRECTION

PATENT NO. : 7,861,959 B2
APPLICATION NO. : 12/087210
DATED : January 4, 2011
INVENTOR(S) : Bent Eriksen It is certified that error appears in the above-identified patent and that said Letters Patent is hereby corrected as shown below:

Title Page

Item (22) PCT Filed, should read:

Dec. 29, 2006

Signed and Sealed this
Twenty-second Day of March, 2011

David J. Kappos
*Director of the United States Patent and Trademark Office*